Figure 5:
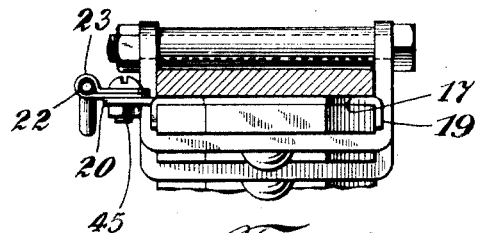

Feb. 16, 1932.  J. BIJUR  1,845,826
CONDUIT INSTALLATION ON VEHICLES
Original Filed March 27, 1923   10 Sheets-Sheet 1
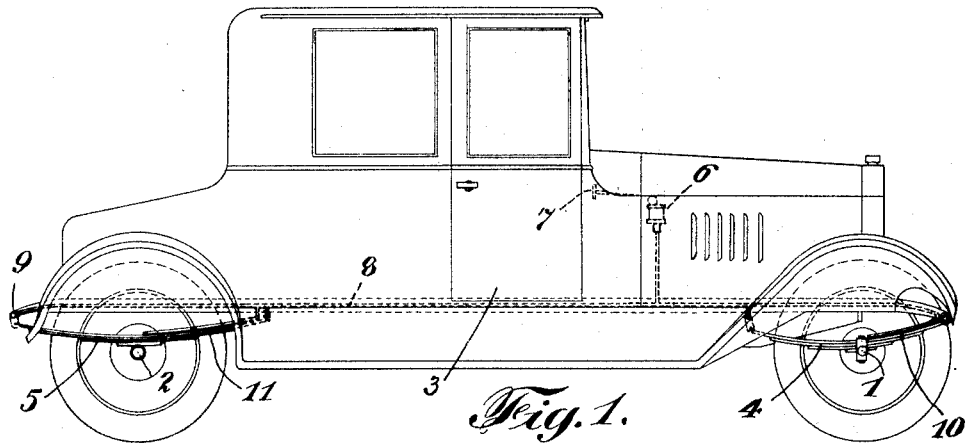
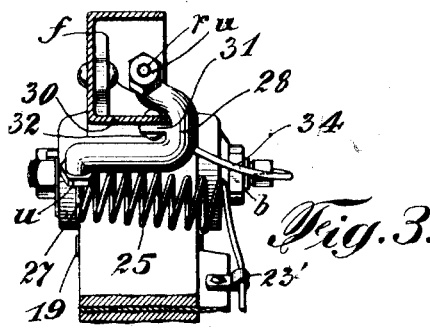
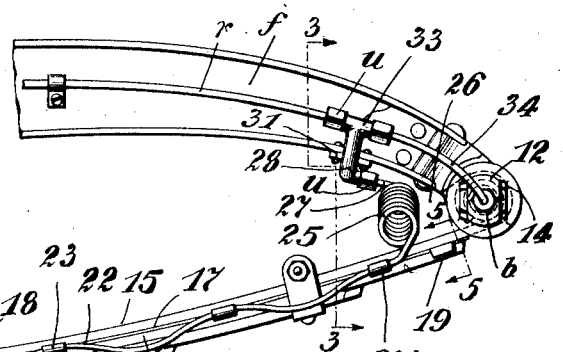
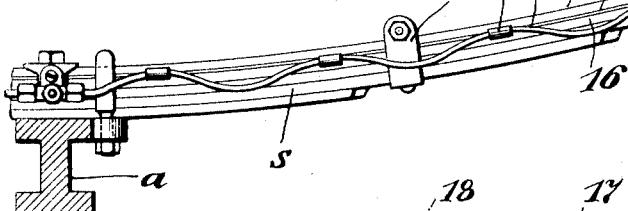
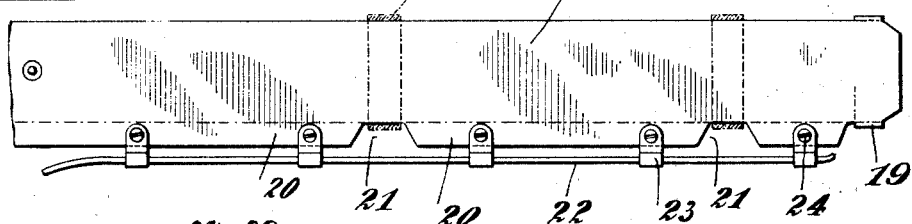
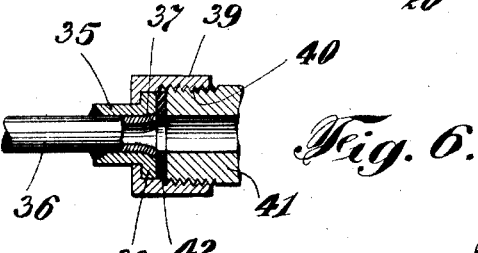
INVENTOR
Joseph Bijur
BY
Dean Fairbank, Obright & Hirsch
his ATTORNEYS INVENTOR
Joseph Bijur
BY
Dean, Fairbank, Obright & Hirsch
his ATTORNEYS

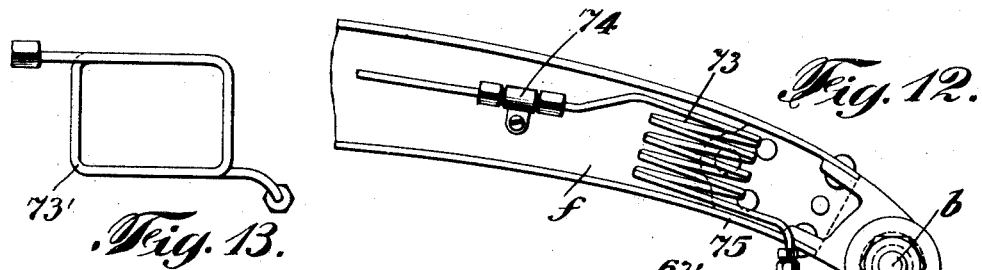
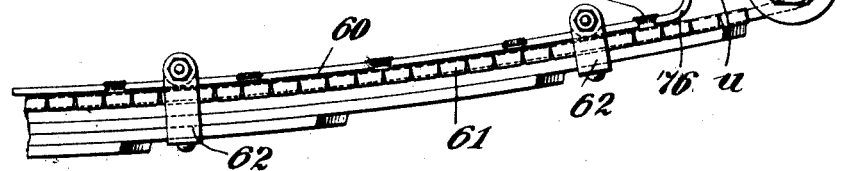
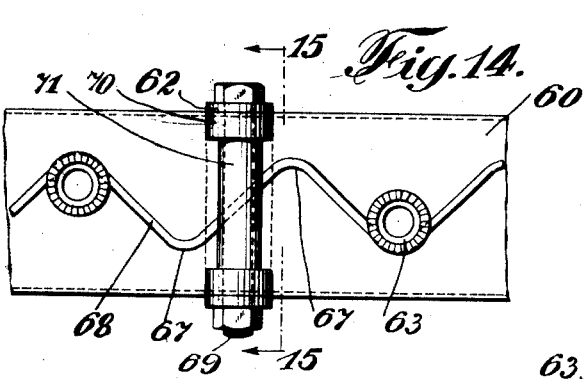
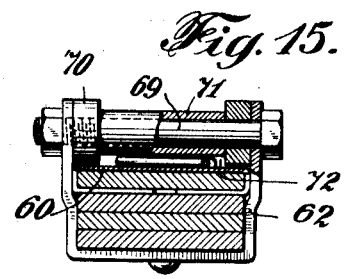
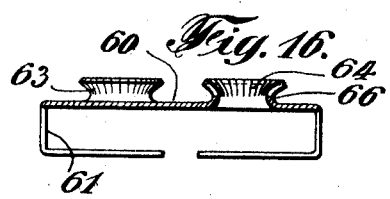
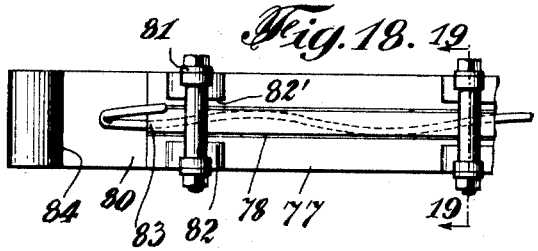
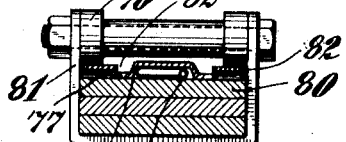
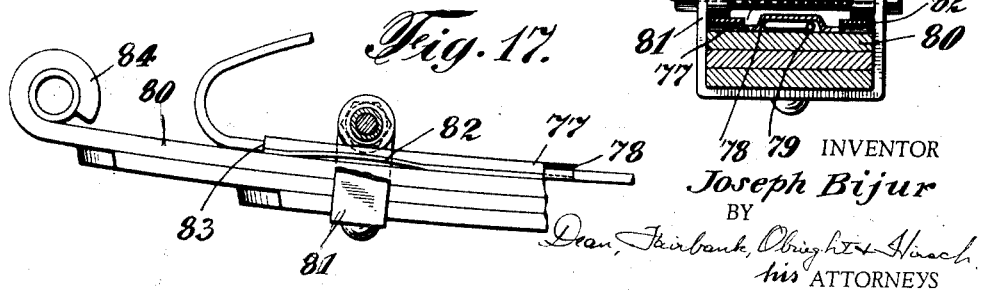

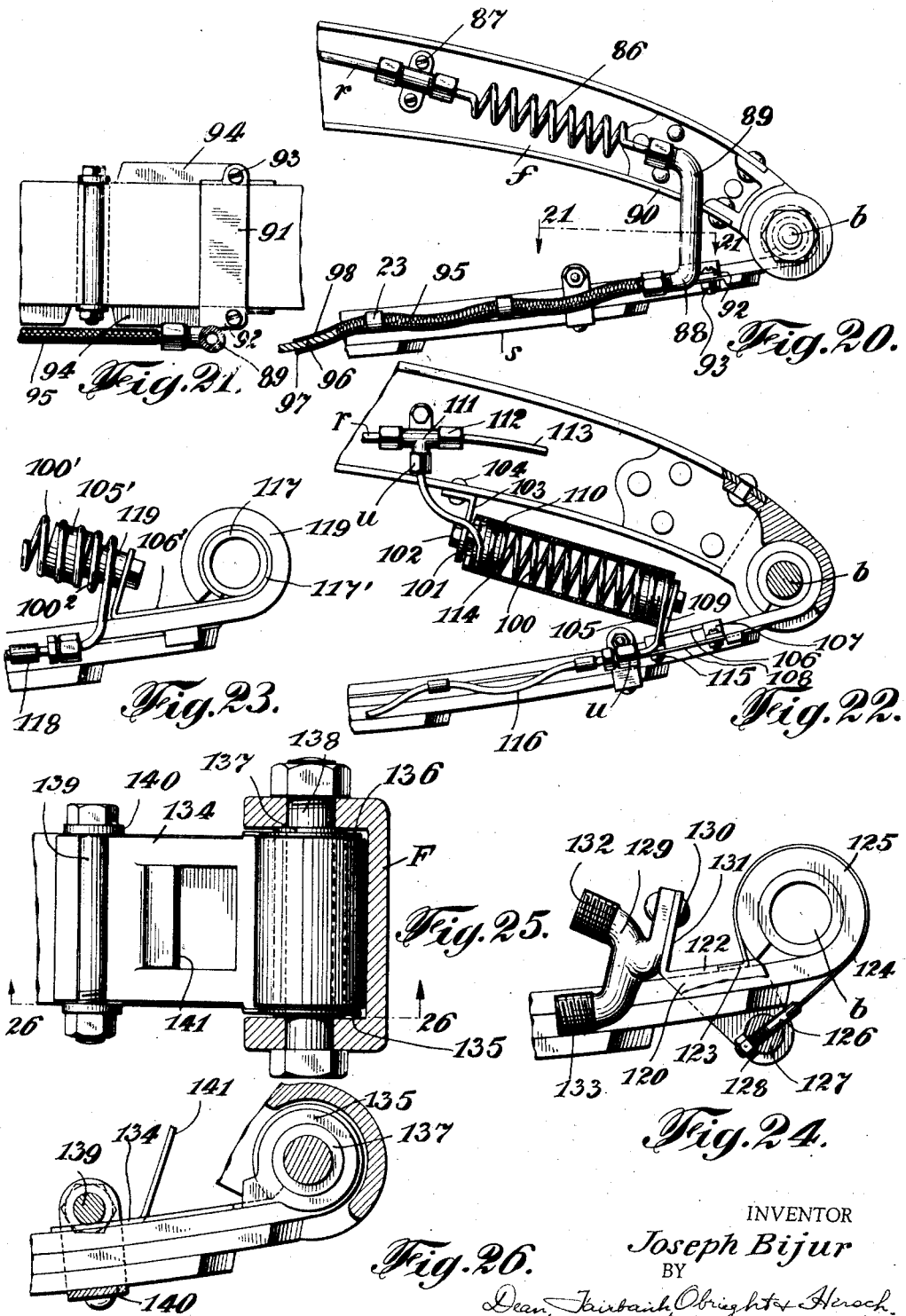

Feb. 16, 1932. J. BIJUR 1,845,826
CONDUIT INSTALLATION ON VEHICLES
Original Filed March 27, 1923 10 Sheets-Sheet 5
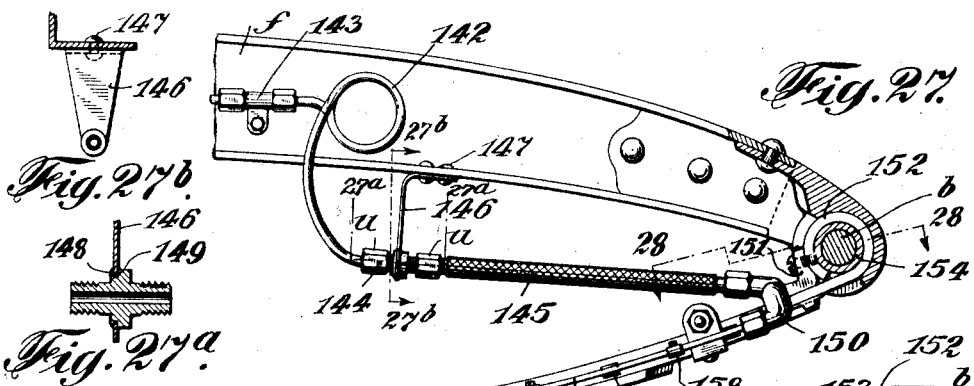
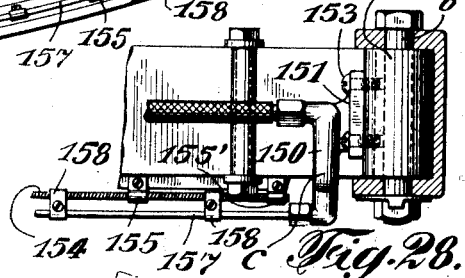
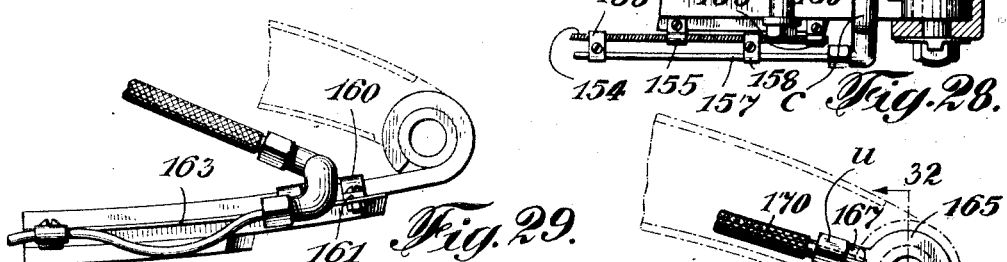
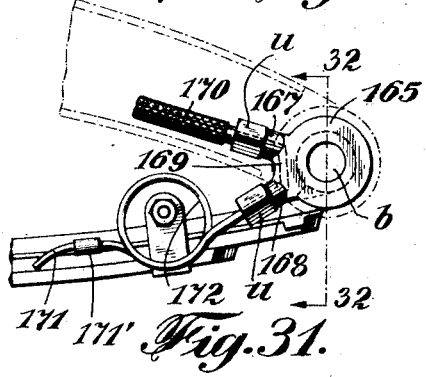
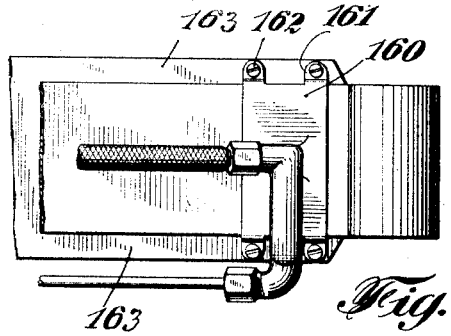
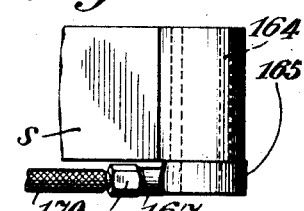
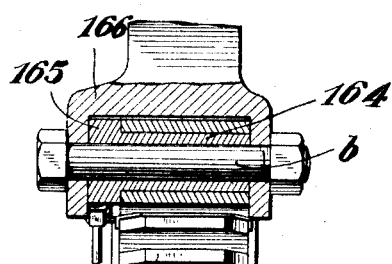
INVENTOR
Joseph Bijur
BY
Dean, Fairbank, Obright & Hirsch
his ATTORNEYS

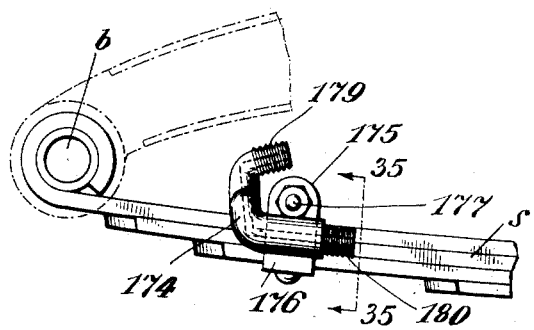
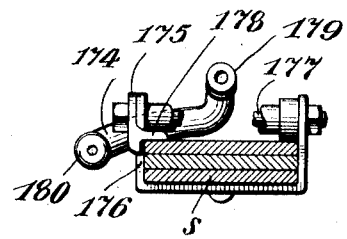
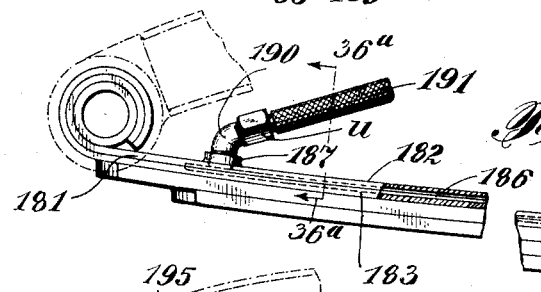
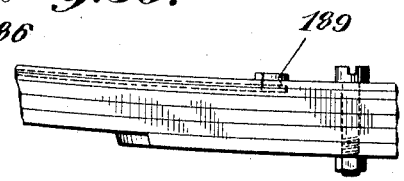
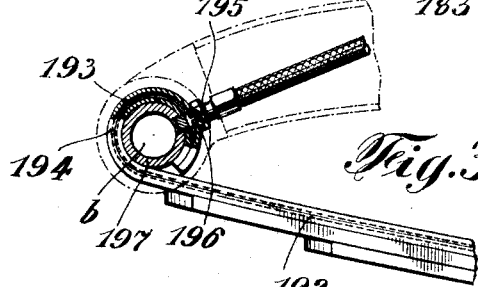
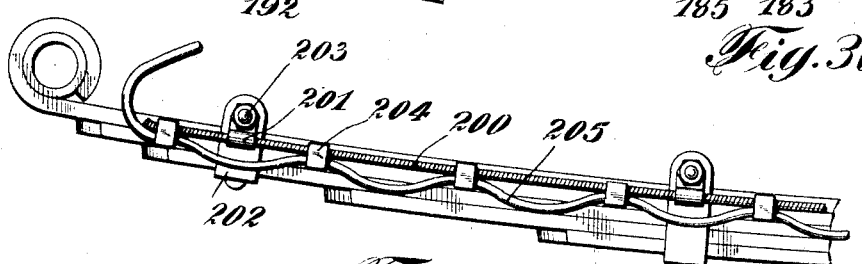

Feb. 16, 1932.    J. BIJUR    1,845,826
CONDUIT INSTALLATION ON VEHICLES
Original Filed March 27, 1923    10 Sheets-Sheet 7

INVENTOR
Joseph Bijur
BY
Dean, Fairbanks, Obright & Hirsch
his ATTORNEYS

Feb. 16, 1932.   J. BIJUR   1,845,826
CONDUIT INSTALLATION ON VEHICLES
Original Filed March 27, 1923   10 Sheets-Sheet 8
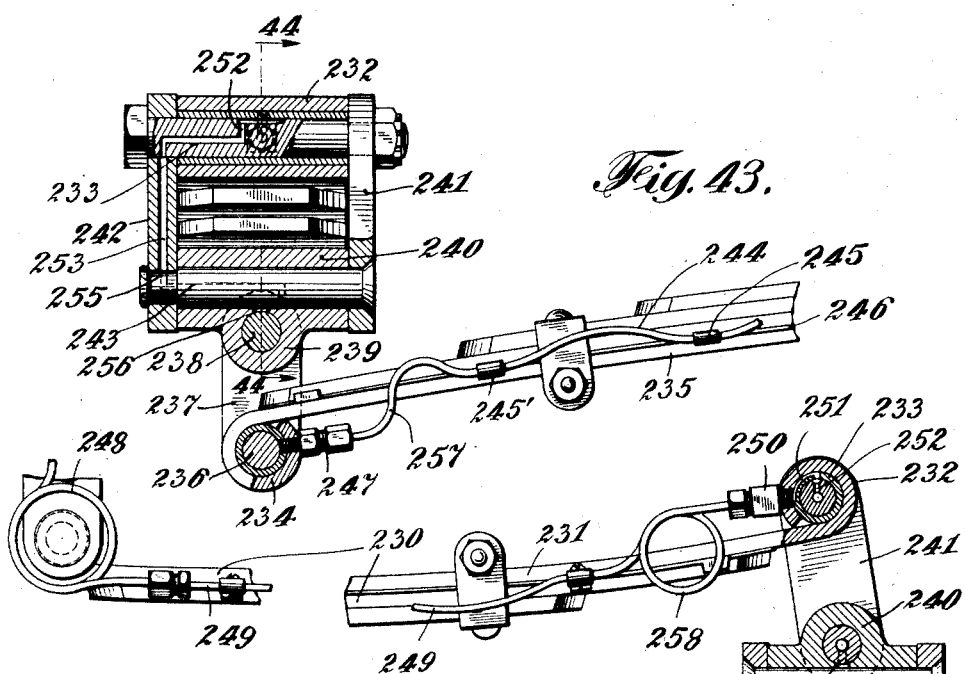
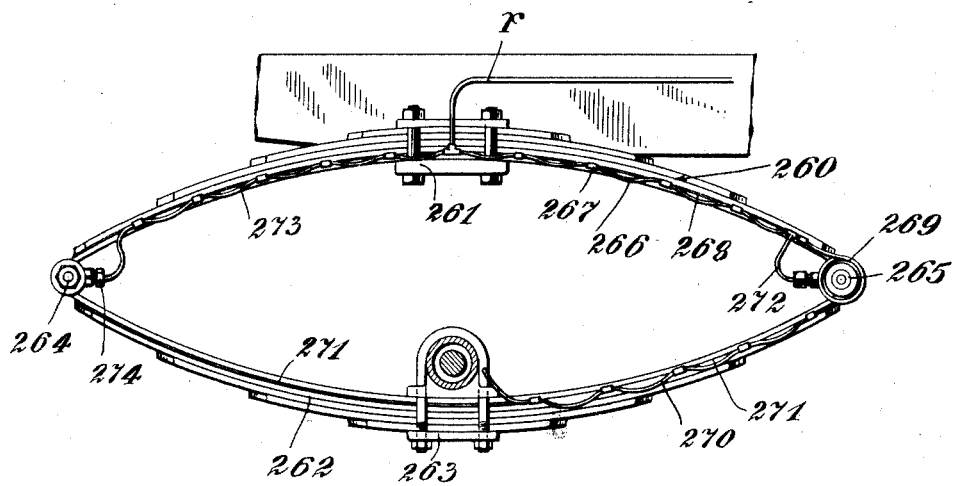
INVENTOR
Joseph Bijur
BY
Dean, Fairbank, Obright & Hirsch
his ATTORNEYS

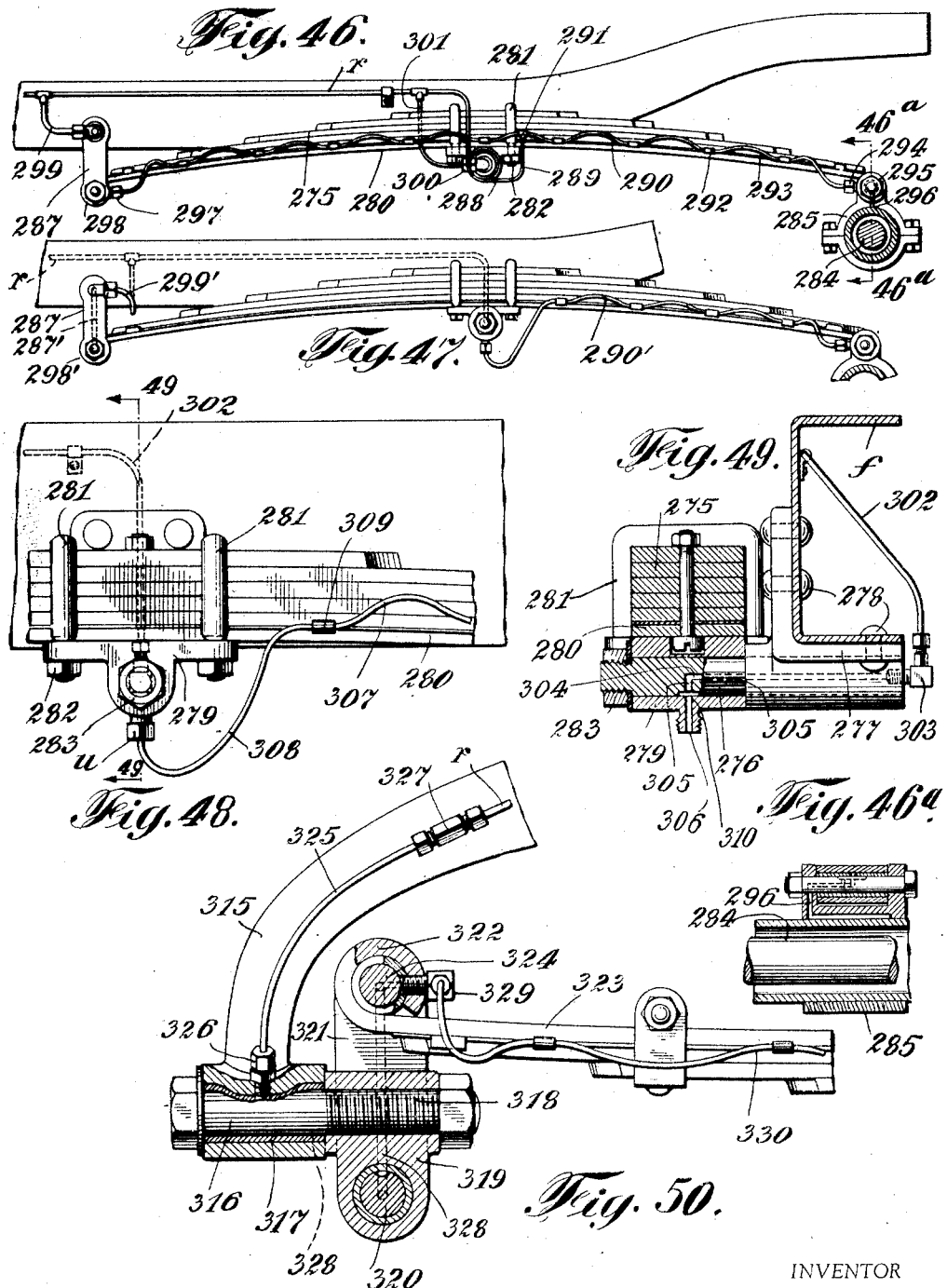

Feb. 16, 1932. J. BIJUR 1,845,826
CONDUIT INSTALLATION ON VEHICLES
Original Filed March 27, 1923 10 Sheets-Sheet 10

INVENTOR
Joseph Bijur
BY
Dean, Fairbank, Obright & Hirsch
his ATTORNEYS

Patented Feb. 16, 1932

1,845,826

UNITED STATES PATENT OFFICE

JOSEPH BIJUR, OF NEW YORK, N. Y., ASSIGNOR, BY MESNE ASSIGNMENTS, TO AUTO RESEARCH CORPORATION, A CORPORATION OF DELAWARE

CONDUIT INSTALLATION ON VEHICLES

Application filed March 27, 1923, Serial No. 627,953. Renewed October 2, 1930.

My present invention relates primarily to installations for transmitting fluid or fluid pressure between the frame and a part movable relative thereto, such as an axle, or axles of a vehicle, and is shown embodied in a system for lubricating, from a point of control on the chassis frame, bearings associated with an axle of a motor vehicle.

The conduit element through which fluid or pressure is transmitted between the chassis frame and the axle should accommodate the relative movement of these parts, which occurs as the springs flex during travel of the vehicle. My invention has among its objects to provide a serviceable conduit of small diameter and low cost, which is easy to instal, on any of a wide variety of vehicles, regardless what the construction or type of frame or springs, which provides the required yield or flexibility where flexure should occur, yet is not subject to whipping, which remains tight even for relatively high fluid pressure, and which is substantially proof against rupture or leak from vibration of the moving vehicle even in hard usage. My invention provides a conduit in the above relation, which has no exposed unprotected parts likely to be bent or broken off by the usual impacts encountered in ordinary usage, which is inconspicuous and which, while accommodating the motion of the axle without undue strain at any part of the conduit, is nevertheless mechanically so strong and is retained in place upon the vehicle structure so securely as not to be torn loose by the driving of the vehicle through brush or brushes, which will suffer no substantial injury from bombardment by ice or loose stones, that may be thrown up from the road by the movement of the vehicle thereon, which will not be torn off or damaged by mud frozen thereon, and which will not be disturbed by handling as by removing mud in cleaning the vehicle.

According to my invention, the conduit includes a yielding portion extending from the frame to a part which moves with one of the vehicle springs through a comparatively small range of displacement relative to the frame and extending thence in a run lengthwise of the spring toward the axle. The run along the spring which I designate the spring run, is disposed for displacement as a unit with the displacement or flexure of the spring structure at a plurality of points and is constructed and arranged for distributed flexure thereof, to avoid the localization of the bending or curving strain. Thus, the yielding conduit portion, first referred to, which I call the bridging run is connected between points on the chassis frame and the spring having a minimum relative displacement and the spring run extends along the spring, successive parts of the spring run having successively greater ranges of displacement controlled by the spring flexure. The invention affords a liquid conduit effecting communication, in the manner referred to, between the chassis and an axle of vehicles generally, whether the spring equipment be of the semi-elliptic, the full-elliptic or the cantilever type.

It is preferred to dispose the entire length of the conduit in such manner as to be protected or shielded by the vehicle construction, against injury from impact or collision. In application at a front spring, I prefer to dispose the bridging run entirely between the upper flange of the channel frame and the spring and to the rear of the forward spring bolt, and to dispose the spring run entirely back of the exposed outer edge of the spring.

The bridging run and the spring run may be formed as one integral conduit length, or they may be distinct elements joined by a coupling, which is anchored to the vehicle spring near a hinging part of the latter, or means distinct from a coupling may be provided for anchoring to the spring structure, a conduit part near the region of communication between the spring run and the bridging run.

The flexible portion of the bridging run, in certain preferred embodiments, may constitute either a solid metal tubular helix or a length of flexible hose, and may be protected by mounting within the channel frame of the chassis or by disposing it between the channel frame and the spring, to the rear of the spring hinge.

The spring run may be anchored to the spring structure at spaced points movable with corresponding parts of the spring structure, the run being sufficiently flexible between successive anchors to accommodate the relative movement therebetween. In a preferred embodiment, the anchor means for the entire length of the spring run, are all arranged to move in unison with the flexure of some one leaf in the spring, while in other embodiments, different spring run anchors, are on different elements of the spring structure, appropriate means being provided to accommodate the relative slide or composite movement between anchor parts.

The above and other features of my invention may be more fully understood from the accompanying drawings, in which are shown some of various possible embodiments of the several features of the invention.

Figure 8:
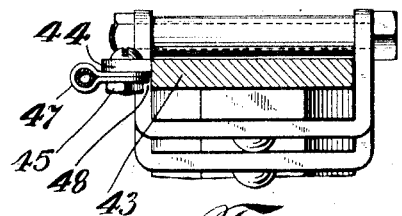
Figure 7:
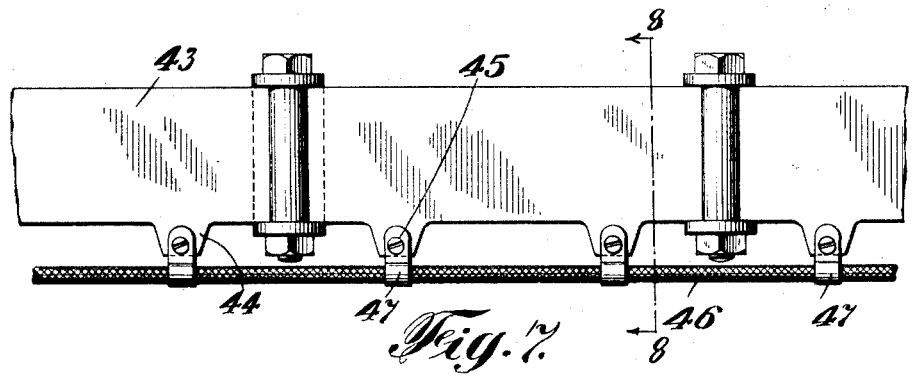
Figure 10:
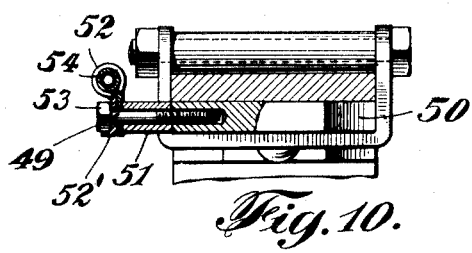
Figure 9:
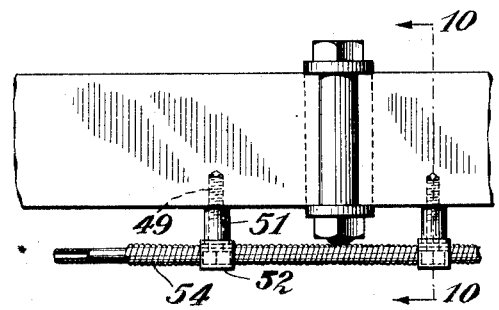
Figure 11:
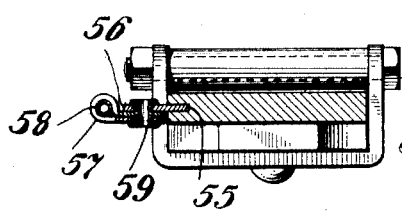
Figure 11A:
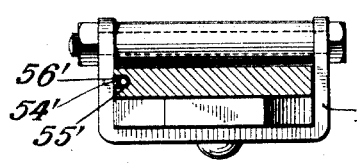
Figure 39:
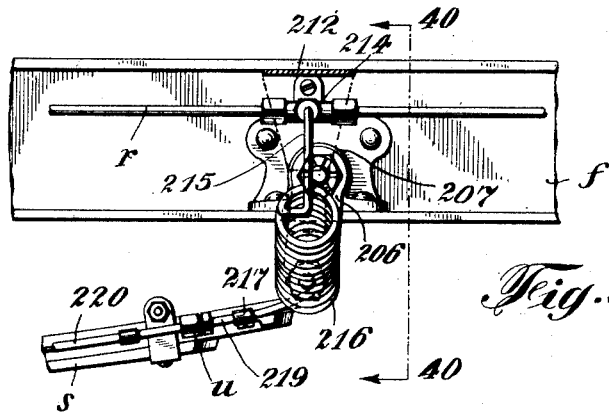
Figure 40:
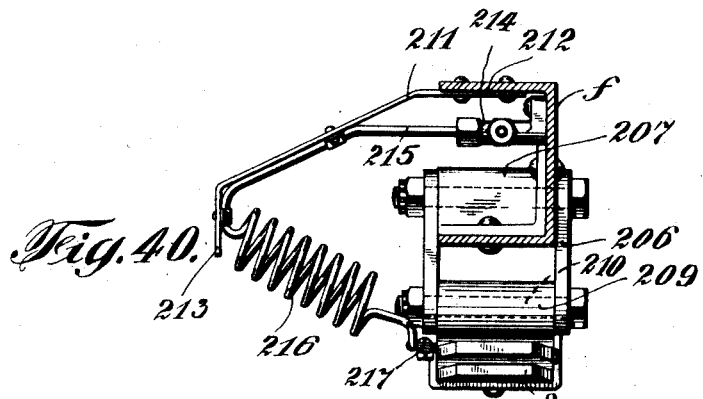
Figure 41:
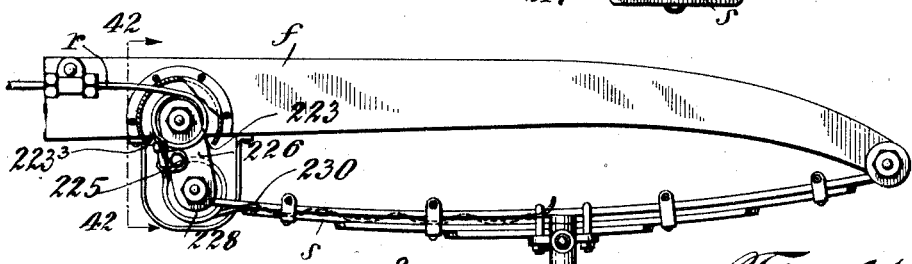
Figure 42:
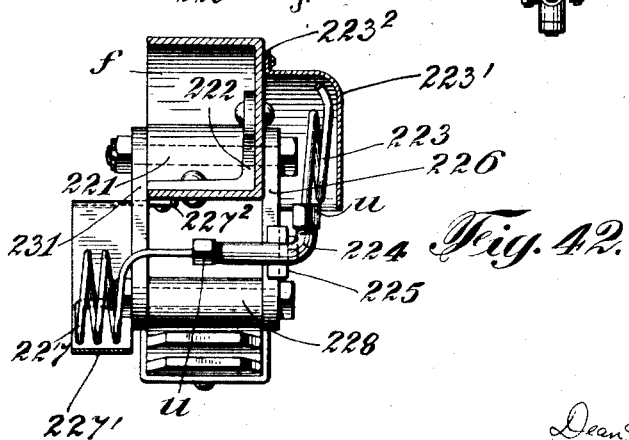
Figure 51:
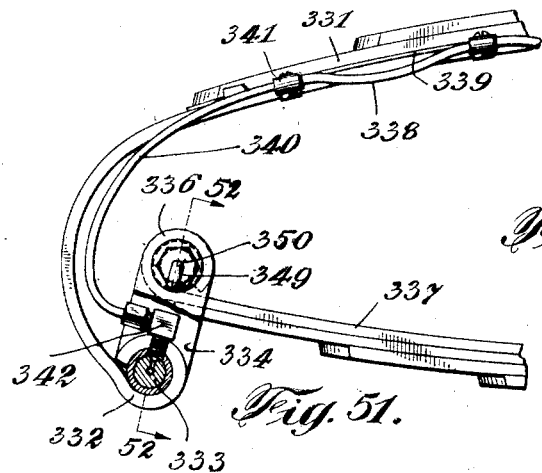
Figure 52:
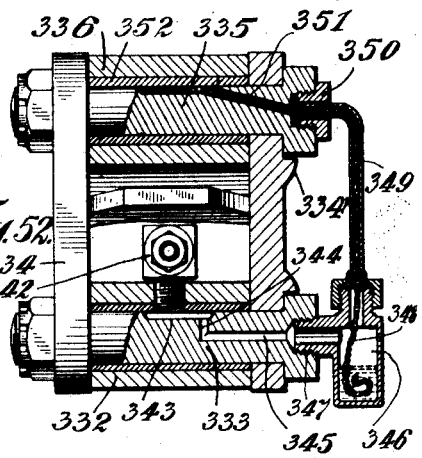
Figure 53:
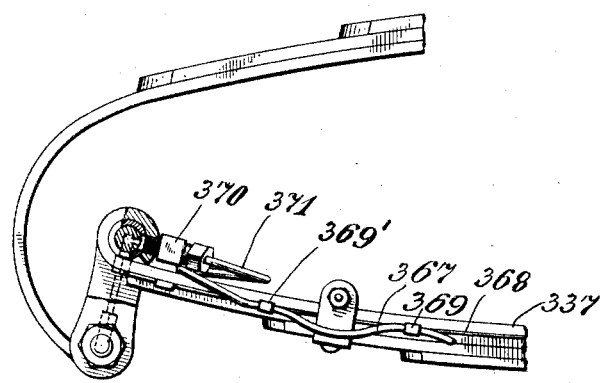

In the drawings,

Fig. 1 is an outline of a motor vehicle in elevation, indicating the general location of the installation, Fig. 2 is a fragmentary view on a larger scale of the front end of a channel frame and front spring, viewed from inside of the vehicle, Fig. 3 is a transverse sectional view taken along the line 3—3 of Fig. 2, Fig. 4 is a plan view of the vehicle spring illustrating one type of spring run attachment, Fig. 5 is a sectional view taken along the line 5—5 of Fig. 2, Fig. 6 is a view in longitudinal section on an enlarged scale, illustrating a preferred form of union connection between pipe elements, Fig. 7 is a view similar to Fig. 4 of the plan of a modified form of spring run mount, Fig. 8 is a transverse sectional view taken along the line 8—8 of Fig. 7, Fig. 9 is a fragmentary view generally similar to Figs. 4 and 8 of a further modification, Fig. 10 is a sectional view taken along the line 10—10 of Fig. 9, Figs. 11 and 11a are views similar to Fig. 10 of further modifictions, Fig. 12 is view similar to Fig. 2 of a modified form, Fig. 13 is a detail plan view of the helix in Fig. 12, Fig. 14 is a view similar to Fig. 9 of another embodiment, Fig. 15 is a transverse sectional view taken along the line 15—15 of Fig. 14, Fig. 16 is a cross-sectional view on a larger scale through the envelope supporting leaf, Fig. 17 is a view similar to Fig. 12 of a further modification, Fig. 18 is a plan view of the spring shown in Fig. 17, Fig. 19 is a sectional view on an enlarged scale taken along the line 19—19 of Fig. 18, Fig. 20 is a view similar to Fig. 12 of a further modification, Fig. 21 is a sectional view taken along the line 21—21 of Fig. 20, Fig. 22 is a view similar to Fig. 20 of another modification, Fig. 23 is a fragmentary view of a modification of Fig. 22, showing more particularly the combined coupling and anchor for the contiguous ends of the bridging and spring runs, Fig. 24 is a view similar to Fig. 23 and on a larger scale of a further modification, Fig. 25 is a plan view of a still further modification for the general purpose of Fig. 23, Fig. 26 is a sectional view taken along the line 26—26 of Fig. 25, Fig. 27 is a view similar to Figs. 20 and 22 of another modification, Fig. 27a and Fig. 27b are detail sectional views respectively on the lines 27a—27a and 27b—27b of detail elements shown in Fig. 27, Fig. 28 is a sectional view taken along the line 28—28 of Fig. 27, Fig. 29 is a fragmentary view of a modification of the general type of construction of Fig. 27, Fig. 30 is a plan view of the modification of Fig. 29, Fig. 31 is a view similar to Fig. 29 of a further modification, Fig. 32 is a sectional view taken along the line 32—32 of Fig. 31, Fig. 33 is a fragmentary plan view of Fig. 31, Fig. 34 is a fragmentary view of a spring, illustrating another alternative form of coupling and anchor between bridging and spring runs, Fig. 35 is a sectional view taken along the line 35—35 of Fig. 34, Fig. 36 is a fragmentary view of an alternative form of spring run, Fig. 36a is a sectional view taken along the line 36a—36a of Fig. 36, Fig. 37 is a fragmentary view of a modification of Fig. 36, Fig. 38 is a view similar to Fig. 17 of a further modification, Fig. 39 is a fragmentary detail view, illustrating a connection from chassis frame to the spring at the shackle end thereof, Fig. 40 is a sectional view taken along the line 40—40 of Fig. 39, Fig. 41 is a side elevation viewed from the exterior of the vehicle of another modification of conduit, bridging at the shackle end of the spring, Fig. 42 is a sectional view taken along the line 42—42 of Fig. 41, Fig. 43 is a rear elevation with parts broken away and parts in section, showing the application of conduit to a special type of platform spring construction, Fig. 44 is a sectional view taken along the line 44—44 of Fig. 43, Fig. 45 is an elevation of a conduit application to a full elliptic spring, Fig. 46 is a view similar to Fig. 45, illustrating a conduit application to a cantilever spring, Fig. 46a is a sectional view on an enlarged scale taken along the line 46a—46a of Fig. 46, Fig. 47 is a view similar to Fig. 46 of a modified application to cantilever springs, Fig. 48 is a side elevation on an enlarged scale of a detail of Fig. 47, Fig. 49 is a sectional view taken along the line 49—49 of Fig. 48, Fig. 50 indicates the lubrication of special bearings in a special type of chassis spring mount, Fig. 51 is a fragmentary side elevation, illustrating the lubrication of the shackle link in a three quarter elliptic spring type of construction, Fig. 52 is a view on an enlarged scale taken along the line 52—52 of Fig. 51, Fig. 53 is a view similar to Fig. 51 of a modification thereof.

Similar reference characters refer to similar parts throughout the several views of the drawings.

In Fig. 1, I have shown in outline, a motor vehicle of conventional construction, including front and rear axles 1 and 2, a chassis 3, interposed front springs 4 and rear springs 5, each illustratively of the semi-elliptic type. In the engine compartment is shown diagrammatically a source of lubricant pressure 6, operated as by handle 7 at the instrument board and communicating through conduit 8 with various chassis bearings as at 9, through a conduit as at 10 with the front axle 1, and through a conduit 11 with the rear axle 2. The present invention is especially concerned with the fluid or liquid conduit 10 or 11, which connects the chassis frame and an axle, and although shown illustratively applied in a lubricating installation, is of broader application in other relations where fluid or fluid pressure is to be transmitted between the chassis and one or more axles, as for instance, to fluid brake or speedometer operation.

Referring to Figs. 2 to 5, I have shown on a larger scale, a fragmentary view of the front end of the vehicle including the axle $a$ and spring $s$, secured thereto near its center, the spring composed of the usual superposed spring leaves, the upper or longest of which is curved in usual manner, at its forward end into eye 12, encircling the spring bolt $b$ that extends through the forward end of the channel frame of the chassis and is retained as by lugs 14 against rotation in the frame.

In the present embodiment, there is interposed between the upper or longest leaf 15 of the spring and the leaf 16 therebelow, a spring metal interleaf 17 extending lengthwise of the spring, preferably the entire length thereof, from eye to eye and clamped in position by the same conventional U clips 18 which retain the spring leaves in the assembled spring structure and retained, moreover, against lateral displacement as by integral lateral ears 19 bent downward against the edges of the spring. The interleaf is of greater width than the spring leaves and provides a ledge 20 projecting or protruding outward from the rear or concealed edge of the spring, said ledge being cutaway as at 21 to afford clearance for the U clips 18. A run of fluid conduit 22 extending lengthwise of the spring, and designated by me as "spring run" is anchored to the protruding ledge 20 of the interleaf preferably by sheet metal clips 23 encircling the conduit at intervals and secured to the projecting ledge as by bolt and nut elements 24 extending through corresponding holes in the clip ends and in the ledge. The fluid conduit 22 is shown of solid metal, for instance, brass pipe of suitable internal diameter, which may be as small as $\frac{1}{16}''$ in internal diameter, for liquid pressure transmission, and $\frac{1}{8}''$ or more for gravity feed. As best shown in Figs. 2, 4 and 5 the spring run is of undulatory form and extends in a vertical plane beyond the ledge 20, the crests of the waves of the spring run being anchored at the clips 23, the run drooping between consecutive clips to afford extra length for bending.

The extreme clip 23' at or near the inlet of the spring run is preferably in close proximity to the eye 12 of the spring and is located, as will be seen, at a point of the spring which has but a relatively small range of displacement relative to the frame. The run of the conduit which connects between the chassis frame and the inlet of the spring run, and designated by me as "bridging run" provides sufficient flexibility to accommodate, without whipping the relative movement between the chassis frame and the clip 23'. In the specific embodiment shown in Figs. 2 and 3, the bridging run comprises a tubular metal helix 25 formed as an integral part of the tubular metal spring run 22, and anchored at one end by clip 23', which, in this case, constitutes the junction anchor clip, securing the communicating ends of the bridging and spring runs to the spring. The helix 25 extends transversely of the spring toward the outer edge thereof and preferably within the angle 26 between the spring $s$ and channel frame $f$, and to the rear of the spring bolt $b$, and is preferably inclined upward to be higher at its outer end 27 than at its inner end. A fitting 28 connects the upper end of the helix 25 to the run $r$ of the line, which extends longitudinally within the channel frame. The fitting 28 in the present embodiment, straddles the edge of the lower flange 30 of the channel frame and has a lug 31 riveted as at 32 to said flange 30 and near the spring eye 12 and is attached to the line run $r$ and the helix 25 as by unions $u$. Preferably the fitting 28 has a T head 33 from which a short conduit 34 is supplied, which delivers to the spring bolt $b$.

The union $u$ (see Fig. 6) comprises a ferrule 35 brazed to the end of the pipe or conduit 36, which latter is, moreover, spread at its end 47 into a corresponding bevel in the ferrule. Encircling the shank of the ferrule 35 and held by flange 38 of the ferrule against loss, is a female or cap element 39, threaded internally for coaction with a corresponding threaded nipple 40 at the end of the coupling fitting 41. If desired, a compressible washer 42 may be interposed between the ferrule and the coupling to assure a fluid-tight connection. The union shown and described is of general application, and is generally used wherever unions are indicated in any of the various embodiments.

In operation of a vehicle equipped as described, the relative movement between the coupling element 28 constituting a fixed part on the channel frame and the junction anchor clip 23', which has but a small range of displacement with the spring, is accommodated by the inherent flexibility of the helix 25 and also by reason of its inclination, which permit respectively of an opening or closing hinging movement of the helix and a vibratory movement of the helix as a whole about its inner end as an axis. The clips 23 along the spring interleaf have successively greater ranges of displacement, each clip positively deflecting a corresponding portion of the spring run in conformity with the deflection of the corresponding portion of the spring, the extra length in the undulatory conduit 22 accommodating any relative movement between consecutive spring run clips 23. The bridging run provides the flexibility to accommodate the relative movement between the chassis frame and a portion of the spring near the eye thereof, and is yet too stiff to flap during movement of the vehicle, while the flexure of the spring run is distributed over the length of the flexing spring. While I avoid excessive strain at any localized part of the conduit, it will be seen that I have no loose conduit parts likely to be destroyed by flapping or to be torn off in traveling through brush, bushes and the like.

The arrangement of conduit described, is applicable to a substantial variety of automobiles including trucks and particularly in any relation where the angle between the channel frame and spring is sufficiently wide, as shown in the drawings, to accommodate the flexible helix 25. The helix, it will be noted, may be of small diameter in the order of that of the spring bolt $b$, if desired, and since it has convolutions limited in number merely by the width of the spring, as best shown in Fig. 3, it is amply flexible for the purpose.

As indicated in the drawings, the protruding ledge 20 on the interleaf and the clips 23, in turn, protruding therefrom, space the spring run 22 by a substantial interval from the contiguous edge of the spring, so that any water or mud thrown up, will drop freely from therebetween, avoiding the possibility of strain or rupture of the line by tearing loose in starting or during travel, mud frozen in place between the spring and the conduit.

It will be seen that my present embodiment of conduit entails no objectionable modification in the construction of the vehicle and that it is inherently of inexpensive and durable construction and that, moreover, it provides no ungainly or unconventional exposed parts, the entire conduit being substantially out of sight, and well protected against impact or collision, either from the front or the side of the vehicle.

In Figs. 7 and 8 is shown an alternative form of spring run mount. In lieu of the interleaf, one of the main leaves of the spring, for instance, the top leaf 43, is provided with integral lateral lugs 44, extending from the inner edge thereof and perforated for attachment of the spring run conduit 46 by clips 47 attached by bolts 45 in substantially the same manner as in Fig. 4. Preferably the protruding lugs or ledges in Figs. 7 and 8 are of considerably less thickness than the spring leaf, being made thin as at 48, to facilitate perforation thereof for attachment of the anchoring clip bolts 45.

In Figs. 9 and 10 is shown a further modification of spring run, in which the anchoring means comprises a succession of screws 49 threaded directly into the rear or concealed edge of one of the leaves of the spring, in the present embodiment illustratively applied to the first leaf 50 adjacent the main leaf, said screws being suitably distributed at intervals between the eye and the middle of the spring leaf. The protruding portion of each screw extends through a bushing 51 and through the ends of a spring clip 52, which are clamped by screw head 53 against the edge of the spring. The clips 52 are similar to those in Figs. 4 and 5 heretofore described, but are shown, in the present embodiment, with each conduit-encircling loop, above the securing member. The clip 52 is, moreover, shown with an integral lug 52' bent over against one side of the polygonal screw head to lock the screw. In Fig. 9 I have illustratively shown the spring run conduit as encased in a helically wound metallic armor 54 for added protection, and said run may have an undulatory form similar to that heretofore described.

In Fig. 11 is shown another embodiment of spring run. In this case, the upper leaf of the spring is shown provided with a longitudinal groove 55 in the rear or concealed edge thereof, into which is secured a spring metal anchor blade 56 protruding beyond the edge of the spring and flexing with the spring. The clips 57 for anchoring the spring run 58 are mounted upon the protruding anchoring leaf and are illustratively shown secured thereto by means of eyelets 59. In this construction, as shown in Fig. 11 a strict uniformity of the main leaf throughout its length is preserved, so that no irregularity exists tending to start a crack at a change in spring cross-section.

In the alternative embodiment of Fig. 11a, the spring run conduit 54' is lodged within a groove 55' longitudinally of the main leaf and is retained against escape from the groove, not only by the spring U clips 18', but also by peening the edges of the groove over the spring run as at 56' at suitable intervals.

In each the various embodiments of spring run mounts, heretofore described, it will be seen that the conduit is mounted entirely upon one of the leaves or upon a special interleaf in the spring, and the flexure of the spring controls that of the spring run.

In the embodiments of Figs. 12 to 16, the spring run does not extend in a vertical plane to the rear of the spring, but is disposed on top of the main leaf of the spring. For this purpose, the conventional spring is modified by adding to the construction thereof, a top or envelope anchoring leaf 60, comprising a blank of spring metal superposed over the main spring leaf and having integral lateral tongues 61 tucked about the edges of said leaf, and extending under the lower surface thereof, and clamped by the spring clips 62 in position into a unitary spring structure. The metal of the anchor leaf is drawn to form circular studs or bosses 63 preferably at uniform intervals, which are slit as at 64 to form tongues, the free edges of which are bent over to provide gripping ears for the spring run. The length of spring run between each pair of successive bosses is curved preferably into an S formation 67, as shown, to provide flexibility for accommodating the differential movement between the bosses with the flexure of the spring, said S formation, moreover, providing a minimum width of conduit between the jaws of the spring clips 62, which are midway between successive studs 63. To avoid crushing of the conduit 68 by pressure of the spring clip bolts 69 thereagainst in spring flexure, it is preferred to modify the clip construction in the manner shown in Fig. 15, in which washers 70 are shown secured adjacent the upper ends of the clip, the bolt 69 extending through said washer and through an interposed spacing sleeve 71. The washers, when pressing in extreme position upon the envelop leaf 60, afford a space 72 thereabove, below sleeve 71 through which the spring run extends with sufficient clearance to prevent injury thereto.

In the present embodiment, the bridging conduit is shown as a generally helical tubular solid metal conduit 73 within the channel frame f of the vehicle anchored to the frame at its inlet end by a fitting 74, and extending downward past the lower flange 75 of the channel to the rear of the spring bolt b and in proximity thereof and connected as by a union u to the integral upward extending end 76 beyond the extreme anchor stud 63' of the spring run, which latter stud serves as the junction anchor clip for communicating ends of the bridging run and spring run.

The helix 73 in the present embodiment is shown of generally rectangular convolutions 73' (see Fig. 13) to fit within the channel frame f. The bridging connection between coupling 74 and junction anchor stud 63', and more particularly the helical portion 73 thereof, has flexibility to accommodate both the vertical and the lateral components of movement of stud 63' with spring flexure. In this accommodation, the helix 73 during spring flexure will alternately contract and expand axially, and its axis will concurrently oscillate. The anchoring studs 63 of the spring run 68 on the envelop leaf 60, move substantially as a unit with the upper spring leaf and the extra length of conduit between consecutive studs, freely accommodates, any relative movement between said studs during spring flexure.

The present embodiment of mount, it will be seen, affords ample protection for the conduit, the flexible portion of the bridging run being completely encased within the channel frame and the spring run being on top of the spring and wholly between the sides thereof, so that it cannot be injured by any impact, nor become caught by any brush through which the vehicle may pass. Moreover, the vertical portion 76 of the conduit between the helix 73 and the stud 63' is fully protected behind the spring bolt b. The bridging connection shown, is useful in any relation where the channel frame is sufficiently wide in proximity to the end of the spring to accommodate the helix. This type of conduit is particularly inexpensive and easily applied without modification in the style and construction of the vehicle.

In Figs. 17, 18 and 19 is shown another modified form of conduit run along the top of the spring, in which, in lieu of the envelope anchoring leaf shown in Fig. 16, I employ a spring metal protective blade 77 superposed over the spring run, and provided with a longitudinal groove or channel 78 pressed into its lower surface, in which the spring run 79 is lodged. The spring run may, as shown, be of undulatory form. The protective leaf is clamped against the upper spring leaf 80 by the usual spring clips 81, to form a unitary structure with the spring, the clips being modified as in Fig. 15, by the addition of spacing washers 70, which prevent any possible crushing of the channel 78 or the spring run 79 confined therein. The sides or legs of spring clips 81 hold the protective leaf against lateral shift. Preferably the top or spring run protective leaf 77 is slit longitudinally in the regions of the spring clips and near the lateral edges of the leaf as at 82', the short strips between the slits and the contiguous edges being bent up to form spring loops 82, to provide further frictional hold of the protective leaf against the washers 70, with resilience to accommodate the relative displacement of the clips and the spring leaves in the flexure of the latter, during travel of the vehicle. The spring run 79, it is seen, is thus entirely enclosed between the top leaf 80 and the protective leaf 77 and is, therefore, adequately protected against injury. As best shown in Fig. 17, the top leaf 77 may terminate as at 83 near spring eye 84, and the conduit may curve upward as at 85 beyond the protective leaf for communication with an appropriate flexible bridging run element (not shown).

It is understood that the lateral gripping tongues 61 of the envelop leaf in Fig. 16, may be omitted, the anchor leaf being assembled with the spring in the manner shown in Figs. 17 to 19; or vice versa, the gripping tongue of Fig. 16 may be used, if desired, in the embodiment of Figs. 17 to 19.

In the embodiment of Figs. 20 and 21, the bridging run comprises a metallic helical tube 86 within the channel frame $f$, and with its axis extending generally longitudinally thereof. The bridging run is connected to the run $r$ of the line by a coupling fitting 87 anchored to the channel frame. A rigid coupling fitting 88 connects the delivery end of helix 86 to the spring $s$ and includes a substantially vertical tube 89 in proximity to and back of the spring bolt $b$ and extending transversely past the lower flange 90 of the channel frame. The fitting 88 in the present embodiment comprises a casting with an integral transverse web 91 superposed over and extending laterally beyond the spring as at 92 and attached as by bolts and nuts 93 to projecting ledges 94 at opposite edges of a spring interleaf generally similar to that shown in Fig. 4. Thus, the casting 88 constitutes a combined junction anchor clip and coupling between communicating ends of the bridging and spring runs.

In the present embodiment in lieu of the solid metal tube spring run of Fig. 4, I have shown by way of example, a spring run 95 of flexible hose. A preferred type of hose includes a metal lining 96 constructed by spirally winding and interfolding contiguous edges 97 of a strip of metal, said lining being enclosed in a woven steel sheath 98. The hose just described is not my invention, but constitutes an article of commerce. Since the hose 95 is of greater flexibility than the tubular metal run shown in Fig. 4, it is preferred to provide only small extra length between successive clips 23, the conduit drooping less as shown, than in the case of the solid metal spring run, thereby avoiding the possibility of flapping and distortion of the conduit, and yet permitting it to bend with the spring.

In the present embodiment also, it will be seen that no part of the conduit is inconspicuous and moreover, that all parts of the conduit are protected against impact. In operation, as the spring flexes the coupling fitting 89 partakes of a complex movement having a vertical and lateral component in the plane of the spring. The helix 86 affords the flexibility to accommodate this composite movement, since it will flex about its axis and elongate, depending on the direction of the applied force.

In the embodiment of Fig. 22, the flexible portion of the bridging connection is disposed in a direction generally longitudinally of the vehicle between the channel frame and the spring. Specifically, the helix 100 formed of a metal tube, is anchored at its inlet end to a stud 101 secured as by a bolt and nut connection 102 to a bracket 103, which is in turn riveted as at 104 to the channel frame. At its delivery end, that is, at the region of communication with the spring run, the helix 100 is anchored to a stud 105 similar to stud 101, which is secured to a flange 109 on a stamped metal web 106 extending across the spring and provided with lugs 107 similar to those in Figs. 20 and 21 and similarly secured to the protruding ledges 108 on the interleaf. The stud anchoring flanges 103 and 109 are preferably normally substantially parallel to each other, as shown. For added security, the studs 101 and 105 may be provided with helical grooves 110, upon which the ends turns of the helical conduit 100 are threaded, as shown. The inlet end of the helix 100 is supplied from the main run $r$ through a T fitting 111 to which it is connected as by union $u$, the other branch 112 of the T fitting being connected by conduit 113 to bolt $b$, substantially as in Fig. 2. If desired, the helix 100 may be enclosed in a rubber tube 114, telescoped thereover from the inlet end thereof, prior to assembly and frictionally held at the stud ends. The rubber tube 114 protects the helix from possible injury in prying loose, mud caking thereat, in the absence of the enclosure. The flexibility of the bridging run 100, it will be seen, is confined entirely between studs 101 and 105 and no strain will occur in operation, on the connecting union $u$. The outlet 115 from the helix 100 is connected as by union $u$ to the spring run 116 of the line, which is illustratively shown, as substantially the interleaf construction of Fig. 4.

In various embodiments thus far described, the junction anchor clip which secures the junction between the bridging and the spring runs to the spring, is attached to the same leaf of the spring as the length of the spring run. In Figs. 1 and 20, these parts are connected to an interleaf; in Figs. 11 and 11a the top leaf serves this purpose, and in Figs. 12 to 18, an auxiliary upperleaf is used as a conduit anchor. In many relations, this type of construction is preferred, particularly, since it eliminates the need for compensation for the relative sliding movement between different leaves or spring clips.

I have, however, shown in the embodiments of Figs. 23 to 28 and 30 to 35, desirable arrangements, in which the delivery end of the bridging run and the spring run may have relative sliding displacement in operation.

In Fig. 23 which is in many respects similar to the embodiment of Fig. 22, the anchoring web 106', which anchors stud 105' to the delivery end of helix 100', is not secured to the interleaf, but is looped as at 117' about the bolt bushing 117 and clamped within spring eye 119. The stud 105' is formed of reduced diameter near its base as at 119, leaving one or more loose convolutions $100^2$ of the helix 100', which provide extra length and extra flexibility to compensate for the relative sliding movement between stud 105', which hinges about the bolt and moves with the flexure of the top leaf, and the contiguous spring run anchor clip 118 which slides with the interleaf relative to the top leaf during spring flexure.

To retain the anchor clip in place by coiling it about the spring eye bushing with the spring eye, as in Fig. 23, entails a modification from the usual manufacture of the spring and where such change is objectionable, alternative constructions, such as are shown in Figs. 24, 25 and 26 may be employed. In Fig. 24, I have shown a junction anchoring clip 120, combined into a unit with a fitting 121, which connects bridging and spring runs (not shown in Fig. 24). The clip comprises a stamped metal yoke 122 straddling the edges of the spring near the bolt $b$ and having riveted or welded thereto as at 123, a thin strap 124 encircling the spring eye 125 and welded at its opposite end to a bolt 126, which extends transversely through a cross bolt 127 connecting the legs of the U-shaped bracket 122. By rotation of nut 128 at the outer end of bolt 126, strap 124 is tightened securely about the spring eye 125. In the present embodiment, I have illustratively shown in lieu of the stud 105, an alternative coupling member 129 secured by means of a rivet 130 to the anchoring flange 131 of the clip. The coupling in this case provides an inlet 132 for attachment of an appropriate flexible conduit which may be the helix shown in Fig. 22, or any suitable alternative flexible hose (not shown) and has an outlet nipple 133 to which the spring run (not shown) is connected. If the spring run in this embodiment, is mounted on an interleaf or in any relation other than on the upper leaf, it is preferred to provide extra length or flexibility to accommodate the relative motion between the coupling 129 and the spring run.

In Figs. 25 and 26, the junction anchoring clip comprises a unitary metal stamping, having a base web 134, substatianlly of the width of the spring and provided with integral bent up forwardly extending lateral eyes 135 and 136 encircling the spring eye bushing 137, the latter being lengthened somewhat to take the compression of the spring bolt and nut assembly 138 through the forging F, so that the eyes 135 and 136 of the anchoring clip are securely held without pressure or strain thereon, between the spring eye and the forging. The free or rear end of the anchoring clip web 134 is clamped down upon the upper leaf of the spring by the bolt 139 of the end spring clip 140. The stud holding element corresponding to element 131 in Fig. 24, as shown in the drawings, constitutes a tongue 141 struck up from the web 134.

In Figs. 27 and 28 is shown a further modification, the bridging run of which includes a solid metal looped tube 142, which may be a helix, anchored as at 143 to the channel frame $f$ and well to the rear of the spring bolt $b$ and communicating through a coupling 144 with a length of flexible hose 145, preferably of the type shown in Fig. 20 and heretofore described. A leaf spring 146 preferably generally triangular in form for properly distributed flexure, engages the coupling 144 at its free end and is anchored as at 147 to the bottom of the channel frame and flexes toward the left in Fig. 27 to maintain the flexible conduit 145 normally substantially taut against flapping or sagging. In the embodiment shown, the coupling 144 has an enlarged integral collar 148 firmly secured by upsetting over the edge of a corresponding opening 149 in the spring 146. The conduit elements 142 and 145 are attached to coupling 144 by corresponding union elements $u$ threaded thereon. The flexible hose 145 extends between the channel frame $f$ and the spring $s$ and preferably substantially in the median plane between the exposed and concealed edges thereof, in a direction generally longitudinally of the frame. In this particular embodiment, I have indicated a spring run to the rear of the concealed edge of the spring and to be described more fully below. The bridging and spring runs are connected together by a combined coupling and junction anchoring clip casting having a U-shaped passage 150 in a generally horizontal plane. The casting clip has an integral lug 151 contacting the spring eye 152 and secured thereto preferably by screws 153 threaded into the spring eye. The present embodiment, although of general application, has particular utility as applied to types of vehicles in which the space between the front end of the frame and the spring is too narrow to accommodate the helix shown in some other embodiments.

The coupling casting C, it is readily understood, executes a movement corresponding to that of the spring eye 152, tending to shift the contiguous end of hose 145 upward and toward the right, and, if the opposite end of the hose were fixed, to exert substantial tension thereon. Since the type of flexible hose employed, however, lacks flexibility in a longitudinal direction, the tension due to the clip movement is transmitted through the hose to the spring 146 and the metal loop conduit 142, which readily flex to the extent required. Spring 146, as heretofore noted, maintains the relatively long bridging run against excessive slack or flapping.

In this embodiment, closely wound coil steel spring 154 is shown supported as by loops or clips 155 retained in position upon an interleaf similar to that shown in Fig. 4. The spring run of the conduit may be a metallic pipe 157 anchored to the spring 154 by suitable supporting clips 158, preferably midway between consecutive wire carrier supporting clips 155. In the flexure of the spring s, the relatively heavy spring 154 will flex substantially uniformly with the flexure of the interleaf in a generally vertical direction, and will correspondingly displace the clips 158 thereon, by which the spring run 157 is supported, thereby distributing the strain. The relative sliding movement between the junction fitting C, which moves with the upper spring leaf, and the contiguous spring run clip 155' which moves with the interleaf, is accommodated by the longitudinal flexibility of the carrier spring 154, which permits limited longitudinal shift of the spring run 157 relative to the interleaf. An extra loop 156 in the spring run is shown near the axle thereof, to accommodate the longitudinal shift of the run just noted, although the flexibility may be distributed lengthwise of the spring run in manner previously described.

A modified form of the embodiments of Figs. 27 and 28 preferred in many relations is shown in Figs. 29 and 30. The combined junction anchor clip and coupling is here provided with an integral transverse web 160, extending the width of the spring and with projecting lugs 161 secured as by screws 162 to the protruding ledges 163 of the interleaf. In this embodiment, as in that of Fig. 22, the junction anchor clip and the various spring run clips, are all mounted on one and the same leaf in the spring, in this case the interleaf, the flexure of which is controlling, the need for accommodating relative sliding displacement being thus eliminated.

In Figs. 31 to 33 is shown a further modification of combined junction anchor member and coupling. In this embodiment, the spring bushing 164 is provided with an integral circular flange 165 at one end thereof, protruding beyond the spring s, the clevis 166 for the spring bolt b being, of course, correspondingly widened. The flange 165 is provided with nipples 167 and 168 to the rear of bolt b, and connected by a transverse duct or passage 169 through the flange. The flexible hose or equivalent bridging run 170 is connected to nipple 167 by means of a union u and the spring run 171, which in the present embodiment, is shown of the same type as that shown in Fig. 4 is connected to nipple 168 by a union u. To accommodate the relative movement between collar 165, which rotates with the spring eye on the end of the top leaf, and the contiguous spring run clip 171', which is displaced with the flexure of the interleaf, the intervening conduit portion is shown curved into a complete loop 172, which provides sufficient flexibility for the purpose and yet will not lash or whip. This loop is shown in a vertical plane, but may be disposed, if desired, in a horizontal plane on top of the spring.

In Figs. 34 and 35 is shown a modified form of combined junction anchor clip and coupling element. This element comprises a casting including a generally S-shaped conduit 174, with an integral lug 175 clamped to the side of the spring clip 176 nearest bolt b by means of spring clip bolt 177. The junction clip 174 is also provded with integral supporting fingers 178 projecting inward over the spring, from opposite sides of the spring clip 176 and serving to hold the junction clip against rocking about bolt 177. In this case, the inlet nipple 179 extends obliquely above and somewhat to the side of the spring bolt 177 in a vertical plane between the edges of the spring and serves for connection as by a union (not shown) to the flexible bridging run (not shown) while the outlet nipple 180, as shown extends generally horizontally back of the concealed edge of the spring s, preferably with substantial gap for direct anchoring thereto of a spring run mounted, for instance, as in Fig. 31.

In Figs. 36 and 36a, the upper spring leaf 181 of the spring is shown formed with the spring run of the conduit within the body thereof. For this purpose, the upper leaf is of composite construction, being formed by welding together two leaf elements 182 and 183 of half thickness, in face to face contact, said leaves having registering longitudinal grooves 184 and 185 to form the conduit 186. The composite leaf is provided with a nipple 187 near the bolt end thereof, which may be welded thereto and communicates with a transverse bore 188 through leaf element 182, in turn, communicating with the length of the spring run 186. The opposite end of the spring run has an outlet nipple 189 similar to nipple 187 and located near the axle. In the present embodiment, an elbow fitting 190 is threaded into inlet nipple 187 and through a union $u$ communicates with the flexible element 191 of the bridging run, shown in this case, as a flexible element of the type indicated in Fig. 20, although, of course, substantially any of the other types of flexible elements heretofore described may be employed.

In this embodiment, it will be seen that the spring run is entirely concealed within the main spring leaf and, of course, flexes as a unit therewith leaf, any two selected points on the spring run channel 186 flexing as a unit with the leaf and the intervening portions of the conduit affording the requisite flexibility to accommodate the relative movement between such points.

In Fig. 37 is shown a modification of the type of spring run just described, in which the longitudinal channel 192 in the interior of the upper spring leaf is continued as at 193, substantially about the spring bolt $b$ and within the spring eye 194. In this case, the bridging run is anchored direct to the spring eye by means of an outlet fitting 195 extending transversely into the top of the eye and threaded thereinto and through bushing 197, and having a bore 196 communicating with the bridging run channel 193—192, as shown. In this case, it will be seen that the need for the special nipple 187 is obviated, the spring eye 194 and bushing 197 affording sufficient thickness for securely anchoring the fitting 195. In the use of the latter embodiment, the rotary movement of the spring eye is accommodated by the limited flexibility of the bridging run, while the spring run of the conduit being entirely within the interior of the spring, flexes as a unit with the spring and is, of course, amply protected by the body of the spring against injury.

In Fig. 38 is shown an alternative embodiment of spring run, in many respects similar to that shown in Figs. 27 and 28. In this case, a heavy coiled spring 200 is anchored by loops or clips 201, mounted upon the regular U-clips 202, and secured in place thereon by the U-clip bolts 203. At preferably uniform intervals along the wire carrier 200 are mounted clips 204, three such clips being shown between consecutive U-clips, the clips 204 supporting the spring run 205 of the conduit. In this embodiment, it is seen, the spring run is connected neither to a regular or special leaf of the spring, but is supported from the U-clips. In operation, the wire carrier 200 will not only flex with the vehicle spring, but will elongate or shorten between each U-clip and the contiguous spring run clip 204, at either side thereof, to accommodate the relative movement between the spring U-clips and the spring run.

In each of the embodiments shown and described, the fluid is conveyed from the chassis frame to the axle through a course or conduit, which includes a bridging run and a spring run in series therewith, the bridging run, in general, extending from a point on the chassis frame to a point on the spring in proximity to the bolt end thereof, that is, to a point on the spring having but a relatively small range of displacement, during flexure of the spring, while the spring run extends in a direction generally lengthwise of the spring and is associated with or connected to the spring, to flex in a manner controlled by the spring flexure, each point on the spring run being deflected through a range corresponding to the flexure of the corresponding portion of the spring length. In other words, the bridging run accommodates the relative displacement between a point on the spring near the eye thereof and the chassis frame, while the spring run accommodates the differential flexure between various parts of the length of the spring.

It will be understood that although I have shown in many of the embodiments, a specific form of bridging run with a specific form of spring run, any of the various types of spring runs shown, may be advantageously used in a conduit with substantially any one of the bridging runs disclosed. It will also be understood that the various junction clips or members, which serve to connect the bridging and spring runs, are not limited in their applicability to the specific relations in which they are shown in the drawings, but may be used more or less interchangeably between spring and bridging runs of various types.

The various installations shown, it will be seen, are in inobtrusive position on the vehicle, and do not interfere with the application of a bumper or of the splash apron (not shown) commonly used to cover the forward end of the chassis frame.

Although I have shown in each case, the connection extending to the front axle, it will be understood particularly, as suggested in Fig. 1 of the drawings, that the conduit connections shown are generally applicable for transmitting fluid or pressure between the chassis frame and the rear axle, past the bolt end of the rear spring.

The invention is not limited in its applicability to the conveying of lubricant or lubricant pressure, but has a wider field of application in any relation in which fluid or fluid pressure is to be transmitted between a point on a chassis frame and a point on an axle, and where the relative movement resulting from flexure of the vehicle springs is to be accommodated without excessive strain on the conduit. In particular, the invention is applicable for the operation of fluid brakes, or for establishing a fluid pressure transmitting connection between a mechanism operated by revolution of a road wheel and a speed or distance registering element on the instrument board.

In Figs. 39 to 42 are shown further embodiments, in which the bridging run is connected with the spring at the shackle end rather than the bolt end thereof. Figs. 39 and 40 show a front spring $s$ having its forward end connected to the usual spring bolt (not shown) and its rear end sustained from the usual shackle link 206 which has an upper bolt 207 through the channel frame $f$ and a lower or spring bolt 209 mounting the rear spring eye 210. In this embodiment, a special metal arm 211 is riveted as at 212 to the upper flange of the channel frame, near shackle link 206 and extends inward toward the center of the vehicle, and has preferably an integral downward tongue 213 at its end. The run of the line $r$ on the channel frame is tapped at an appropriate T fitting 214, tap conduit 215 extending longitudinally of arm 211 and being stapled thereto, and to tongue 213 thereof, and thence extending in an integral solid metal helical tube 216 obliquely toward the shackle end of the spring, where it is shown attached to the spring structure by a clip 217. A union $u$ connects the bridging run helix end 219 beyond clip 217 to the spring run 220, the latter illustratively of the type shown in Fig. 4, mounted upon an interleaf, upon which clip 217 is preferably also supported. The spring run, in this case, of course, extends along the rear half of the spring forward from the shackle end to the axle. If desired, in this case as in Fig. 22, the helix 216 may be covered with a rubber or other flexible cylindrical enclosure (not shown) to protect it against injury from rough handling, as in the removal of caked mud.

The bracket arm 211 is preferably of substantial length, so that the helix 216 can be sufficiently long to afford the flexibility required to accommodate, without strain, the displacement of the bridge anchoring clip 217, with the combined flexure of the spring and lateral shifting of the spring bolt on the shackle link. The helical bridging run, it is seen, is amply protected back of the channel frame between the front and rear of the vehicle, and the spring run, as in other embodiments, is protected back of the concealed edge of the spring.

In Figs. 41 and 42 is shown another embodiment for leading from the channel frame to the axle, at the shackle end of the spring. In this case, also, the conventional shackle is attached to the channel frame $f$ in the usual manner by bolt 221 extending through casting 222, within the interior of the channel. The bridging run from the channel frame to the spring comprises a helically curved metallic conduit 223 substantially coaxial with the upper bolt of the shackle and at the forward or exposed end thereof, connected by union $u$ with a coupling elbow 224 secured by bolt 225 to the outer shackle link 226 and intermediate the ends thereof. The end of coupling 224 which extends substantially parallel to bolt 221 is connected by a union $u$ with a second helix 227 substantially coaxial with the lower bolt or spring eye 228, to the rear of the inner shackle link 231. The delivery end of helix 227 is anchored to the spring $s$ near the shackle end thereof as at 230 and communicates with the spring run, which may be identical with any of the runs heretofore described.

It will be seen that in operation the bridging run accommodates the relative movement between the frame and clip 230, including the movement of the shackle link. In this action, helix 223 accommodates the hinging movement at bolt 221, while helix 227 accommodates the hinging movement of the spring eye.

The lower helix 227 is entirely concealed at the rear of the spring and may, if desired, be further protected by a stirrup guard 227' of stamped metal and looped under the helix and having inwardly extending tongue $227^2$, by which it is secured to the channel frame. The stirrup prevents bushes or brush from becoming caught at the helix and injuring it. While the likelihood of injury to the upper helix 223 also is small, as it is located between the front and rear of the vehicle, extra protection may be provided in the form of a guard cap 223' covering said helix and secured at a flange $223^2$ to the frame $f$. The guard has an opening through which conduit $r$ is introduced, and is further cut-away as at $223^3$ at its lower end to accommodate the movement of link 226. The bridging run which includes the helices 223 and 227 and the connecting coupling 224 being anchored only to one of the shackle links 226, is not affected by any relative shift between the links 226 and 231 due to uneven wear, or in effecting adjustment.

In Figs. 43 to 53 are shown certain applications of fluid conduits to vehicles equipped with special types of springs, other than the semi-elliptic springs, shown in the other embodiments. Figs. 43 and 44 show a so-called platform spring application employed on certain types of vehicles. Semi-elliptic lateral rear springs 230 of substantially ordinary construction are secured at their middle points to the axle (not shown). The upper or main leaf 231 of each spring is provided with an eye 232 which encircles the bolt 233 at the upper end of a compound shackle construction, sustained at its lower end upon the eye 234 at the end of a transverse or platform spring 235, which is anchored at its middle to a portion of the vehicle frame (not shown). The compound shackle includes a bolt 236 through eye 234, shackle links 237 extending upward therefrom, and being connected by bolt 238 riveted thereto and disposed in a spacing sleeve or bearing 239 formed with an integral transverse sleeve or bearing 240 between links 241 and 242 of the upper shackle element. A bolt 243 through links 241 and 242 and through intervening sleeve 240 is riveted in position to maintain the parts in assembled relation.

A spring run 244 is connected direct from the frame and anchored lengthwise of the spring 235, as, for instance, at clips 245 on an interleaf 246 and delivers to spring bolt 236 through a fitting 247 transversely through the eye 234. The bearings 232, 240 and 239 are lubricated from a conduit, which includes a bridging run 248 at the forward end of the spring 230 communicating with a spring run 249, which may be of the interleaf type shown in Fig. 4, but extends the entire length of lateral spring 230 and communicates with the upper shackle bolt 233 through a drip or seepage plug 250 threaded laterally into the corresponding spring eye 232. The seepage or dripping plug 250 may be a high resistance fitting of the type disclosed in my copending application, Serial No. 580,688. The bolt 233 has a well or flat 251 at its upper half supplied from the drip plug, the draining through a conduit 252 into a bore 253 longitudinally of link 242. Bore 253 drips into a well 255 near the end of bolt 243, which well drains through duct 254, through bolt 243 to supply bearing 240. It is readily seen that shackle links 241 and 242 are under tension, so that the bolts 233 and 243 tend to be drawn apart, whereby any looseness in the bearings thereof will be at the opposite ends of duct 253, thereby facilitating the supply of oil to the bearing 243. The transverse bolt 238 is in direct communication with the bearing of the bolt 243, through a corresponding duct 256 through which excess lubricant from the bolt 243 enters the bearing of bolt 238.

As the fitting 247 moves with the eye 234 on the lowermost or longest leaf 235 of the platform spring, and the neighboring spring run clip 245' moves with the interleaf 246, the intervening conduit portion 257 is formed with substantial extra length by bending approximately into an S shape to accommodate the consequent relative displacement. Similar relative movement occurs between fitting 250 and the neighboring spring run 249, and extra length for accommodation thereof is provided illustratively in the form of a complete loop 258 substantially as in Fig. 31. Thus, I have provided conduit means moving freely, without any undue stress, to lubricate the various bearings in the special spring equipment set forth and yet providing no substantial extra length likely to flap or whip in use.

In Fig. 45 is shown the application of a conduit to a full elliptic spring structure comprising an upper semi-elliptic spring element 260 secured as at 261 to the chassis frame, and a similar lower semi-elliptic spring 262 to the middle of which the axle is anchored as by a saddle 263. The two semi-elliptic springs are disposed with their concavities facing, connecting bolts 264 and 265 at their ends effecting the hinging connection therebetween. In this case, the conduit connects from the chassis frame to the axle by an upper spring run 266 anchored as by clips 267 to an interleaf 268 on the upper spring element and supplied from chassis line $r$ at the middle or stationary part of the spring. The conduit is coiled at the end of the upper spring run, into a helix 269 coaxial, for instance, with the hinging bolt 265 of the spring and thence extends in a lower spring run 270 similar to the upper run, along the interleaf 271 on the lower spring element to the axle. The bolt 265 may be lubricated through a tap 272 from a point on the spring run 266 contiguous thereto. For lubricating hinging bolt 264, the spring run 266 may be extended toward the left in Fig. 45 along the other half of the upper spring leaf as at 273, delivering to the bolt 264 through a fitting 274. The conduit 266—273 thus extends the entire length of the interleaf 268 on the upper spring 260 and flexes freely therewith without localized strain, as does the lower interleaf spring run 270 extending along the half of the lower spring to the axle. The helix 269 at the bolt 265 easily accommodates the hinging action thereat, without localized strain. Since, in this embodiment, the forward and rear bolts connecting the elements of the spring are identical, the helix construction 269 of diameter larger than bolt 265 is not objectionable, it being understood that this helix would be applied in the case of a front spring at the rear bolt, where it is, of course, inherently protected by the vehicle structure, and in the case of a rear spring preferably at the forward bolt, where it is similarly protected. If desired, however, a protective guard may be provided for the helix.

In Figs. 46 to 49 are shown applications of conduits to a vehicle including cantilever springs. The cantilever spring 275, as will be understood, is pivotally or hingedly mounted between its ends upon a transverse stud 276 formed rigid upon a bracket 277 riveted as at 278 to the channel frame $f$. For this purpose, a saddle fitting 279 is secured to the lower or main leaf 280 of the cantilever spring by U-clips 281 straddling the spring leaves and tightened by nuts 282. The saddle 279 is a sleeve or bearing fitted over stud 276 and maintained in place thereon by nut 283 threaded upon the end of the stud 276. At the rear ends, the cantilever springs 275 carry the road wheel axle 284 which is supported thereon by a saddle 285, the other free end 286 of the cantilever spring being connected to the channel frame by a shackle link construction 287. In the embodiment of Fig. 46, the main run r of the conduit is bent downward toward the pivot stud 276 on the spring, where it is curved into a helix 288 coaxial with the pivot and thence extends upward as at 289 to feed the spring run 290 intermediate the ends thereof through a T fitting 291. The spring run 290 extends the entire length of the cantilever spring 275, and may be anchored, as shown, upon clips 292 distributed along interleaf 293 substantially as in Fig. 4. One end of the spring run delivers through a fitting 294 to lubricate the spring eye 295 which overflows through a duct 296 to lubricate the saddle bearing 284 within the saddle 285. The opposite end of the spring run connects through a fitting 297 to lubricate the spring eye 298 of the shackle. The upper bearing pin of the shackle 287 is lubricated through a branch tap 299 from the main, while the pivotal mount 279 of the spring is lubricated through a fitting 300 supplied from a lead 301 tapping the main r. It will be seen that the various bearings associated with the cantilever spring are adequately lubricated from the main, through conduits constructed and arranged for distributed flexure thereof, but having no substantial loose excess length likely to flap or whip in operation.

In the embodiment of Figs. 47, 48 and 49, the spring run 290' extends from the saddle along the rear portion only of the spring to lubricate the rear eye and saddle bearing as in Fig. 46. In this case, the forward eye 298' is lubricated by overflow through a duct 287', longitudinally of link 287, the upper bolt of which is supplied through the duct 299' tapping the main r. The lubricating shackle may be of the construction shown in Fig. 54 to be described hereinafter.

In lieu of the helix 288 shown in Fig. 46, for passing from the main on the channel frame to the spring run, the main r is curved as at 302 back of the channel frame to feed through a fitting 303, which may be a drip fitting secured axially into the inner end of the spring supporting stud 276 and communicating through a longitudinal duct 304 and transverse duct 305 which drains into a nipple 306 in saddle 279. The end of the spring run 307 is connected by union u threaded upon nipple 306. Preferably the duct 305 is somewhat widened at its lower end 310, whereby some lubricant will escape thereat to lubricate the saddle bearing 279, the main body of the lubricant, however, passing to and through the nipple 306. No substantial leak will occur between stud 276 and saddle 279, since the weight of the chassis frame presses the former downward upon the latter. It will, of course, be understood that the drip plug 303 may be applied at the outer end of stud 276, conduit 302 straddling spring 275, the arrangement shown being, however, preferred.

It is apparent that the conduit means shown in Figs. 47 to 49 for passing from the frame to the spring run, may be substituted for the helix connection for the same purpose in the embodiment of Fig. 46 and vice versa.

In Fig. 50 is shown another application of special character. In this case, the rear of the channel frame 315 is curved downward and carries a horizontal longitudinal rocking bolt 316, having a bearing within a corresponding eye 317 at the end of the channel frame. Threaded and pinned as at 318, upon the inner end of the bolt 316, which protrudes beyond the eye 317 is a forging 319, carrying at its lower end a transverse bolt 320 supporting the shackle links 321 at opposite ends thereof, the upper ends of said shackle links sustaining the eye 322 of the vehicle spring 323 upon a connecting bolt 324.

In this embodiment, bearing 317 may be lubricated from a conduit 325 along the channel frame, connected by fitting 326 into the frame eye 317 and supplied preferably through a drip plug 327 remote from the bolt. The upper or spring eye bearing 322 may be lubricated through an inlet fitting 329 connected to the delivery end of a spring run 330, extending the full length of the spring, the rear half of said spring run, shown in part, being an extension of the forward half, which latter serves to supply lubricant to the bearings at the axle in the manner shown in other embodiments. Bearing 320 is lubricated by oil overflowing from the upper bearing through a duct 328 associated with the shackle link, which may be of the construction shown in Fig. 53 to be described below.

In Figs. 51 to 53 are shown further alternative embodiments of peculiar utility in connection with vehicles having springs of the three-quarter elliptic type. In this type of construction, it will be noted, that the rear of the channel frame is formed into a quarter elliptic spring element 331 with an eye 332 at its lower end for sustaining the lower bolt 333 of a spring shackle 334 about the upper bolt 335 of which the eye 336, of the usual semi-elliptic spring 337, is coiled. It will be seen that the weight of the vehicle frame places the shackle links 334 under tension, and that both ends of the shackle link may partake of displacement relative to the fixed portion of the chassis during spring flexure.

Lubrication may be effected through a conduit 338 extending along an interleaf 339 formed on the upper or chassis portion 331 of the spring and connecting through a curved run 340 from the extreme clip 341, through a drip fitting 342 threaded through the spring eye 332 and communicating with bolt 333.

The upper or spring bolt 335 may be lubricated from the lower bolt by the construction shown in detail in Fig. 52. The fitting 342 here communicates with a well 343 in bolt 333, which well, in turn, communicates near an end thereof with a radial duct 344, merging into a longitudinal duct 345, which supplies an oil reservoir or cup 346 threaded as at 347 into the extreme end of bolt 333. A wick 348 dips into the reservoir 346 and extends upward through a protective tube 349 connected as by a gland 350 into the upper bolt 335. The wick continues through a corresponding groove 351, through bolt 335, and contacts spring bushing 352 at the upper side thereof, whence the lubricant drops freely from the wick for effective lubrication. The usual lugs 334' or their equivalent prevent relative movement of the bolts and links, so that the lubricant is delivered, in the drawings, to the unloaded or loose side of bolts 333 and 335, which is thus retained at all times substantially uppermost as shown. By this construction, it will be seen that the lower bearing 333 of the shackle receives a liberal supply of lubricant collected in the well 343 and the overflow therefrom through the duct 344 is stored in the cup 346 and is supplied by capillary action to the wick 348 for lubricating the upper bolt 335.

In Fig. 53 is shown a further embodiment of the lubrication of the shackle in a three-quarter elliptic spring construction. In this case, the upper bolt is supplied through a fitting 370 in the spring eye and at the delivery end of a spring run 367, which extends the entire length of semi-elliptic spring 337 rearward from the forward bolt end thereof, and is illustratively shown anchored to an interleaf 368 by clips 369 substantially as in Fig. 4.

To accommodate the relative movement between fitting 370 which moves with the eye of the main leaf and spring run clip 369 which moves with the interleaf, the spring run is shown curved into a loop 371 extending substantially horizontally above the spring.

Although in the various applications to specialized spring equipment shown in Figs. 43 to 53, I have shown and described the use of interleaves for carrying the spring runs, substantially as shown in greater detail in Figs. 4 and 5, it is to be understood that substantially any of the various alternative embodiments of spring runs heretofore described, may be satisfactorily employed on any of the specialized spring equipments.

By seamless tubing or pipe is meant that such tubing or pipe is free of open seams which would permit leakage.

I claim:—

1. In a vehicle which includes a chassis frame, an axle and interposed springs each of said springs having a pivot part, a conduit to an axle including a flexible bridging run anchored at one part thereof to one of the springs and near the pivot part of said spring and at another at a part contiguous thereto, with respect to which said spring moves, and another run disposed along and droopingly suspended from said spring for change of curvature therewith and free from rubbing contact with the sides of the spring.

2. In a vehicle having a frame, an axle and interposed springs with a plurality of superposed leaves, a conduit connection from the frame to the axle including a bridging run having a flexible part and anchored at one part to the frame and at another near an end of one of the springs, and a spring run means disposed back of the exposed side of said spring for change of curvature therewith and protected by the spring against impact from the side of the vehicle, said spring run means having parts rigid therewith retained between the contiguous surfaces of uppermost and next uppermost leaves of the spring whereby the spring run means is retained to extend lengthwise of and to flex with the spring.

3. In a vehicle having a frame, an axle and interposed springs, said springs each including an extra leaf extending between but not attached to the spring supports, a conduit for conveying liquid from the frame to the axle, said conduit including a flexible bridging run to a point on one of the springs and near an end thereof from a contiguous part of the frame, and a run extending in a direction lengthwise of the spring to the axle and having a plurality of parts thereon fixed with respect to said extra leaf, said conduit being flexible between the fixed parts, whereby the displacement and deformation of the spring relative to the frame will effect distributed flexure of the conduit.

4. In a chassis lubricating installation for a vehicle having a frame, an axle and interposed springs, a conduit for conveying liquid pressure between the chassis frame and the axle, said conduit including a spring run and a bridging run anchored at one end to the frame and at the other to a part moving with one end of the spring, said bridging run having flexibility to accommodate the limited relative displacement between the anchored parts thereof, but being sufficiently rigid to prevent whipping under vibration, and said bridging and said spring runs being formed of different conduit sections, and a liquid transferring coupling element connecting said sections positioned adjacent to the end of the spring.

5. In a chassis installation for a vehicle having a frame, an axle and interposed springs, in combination therewith, a conduit for conveying liquid lengthwise of one of the springs, anchor means securing said conduit to the spring structure at a plurality of points lengthwise thereof, said conduit drooping between consecutive anchor points in a course having flexibility sufficient to accommodate the relative displacement between said anchor points in the deformation of the spring.

6. In a chassis installation for a vehicle having a frame, an axle and interposed springs, in combination, a conduit for liquid including a flexible bridging run extending from the chassis frame to a point on the spring near an end thereof and a spring run of seamless metal tube anchored to the spring structure at parts thereof having successively greater amplitude of vibration, said spring run having curvature and flexibility between the anchored parts thereof, sufficient to accommodate the differential displacement therebetween, whereby the flexure of said conduit during spring flexure will be distributed over the conduit length.

7. In a chassis installation for a vehicle having a frame, an axle and interposed springs with a plurality of superposed leaves, in combination, a conduit for conveying liquid from the chassis frame to the axle, anchoring means for said conduit, one carried by said frame and a second carried by said spring and near a point of maximum flexibility thereof, said conduit including a bridging run extending between said anchoring means, said bridging run including a seamless metal tube of helical conformation affording flexibility for accommodation of relative movement between the anchoring means during spring flexure, the anchoring means for said spring run including a series of ears projecting outwardly from the inner side edges of one of said upper leaves and a series of clamps attached to the ends of said ears.

8. In a chassis installation, in combination, a conduit for bridging from the chassis frame to an axle, said conduit including a spring run and a tubular metallic helical hinging bridging connection between an end of the spring run and the chassis frame, the axis of said bridging run being transverse to the length of the spring.

9. In a motor vehicle, in combination, a chassis frame, an axle, a spring connecting said elements, conduit anchoring means distributed along the length of the spring and moving with the flexure of the spring at corresponding points, and a conduit extending in a direction lengthwise of said spring anchored at said mounting means and having extra length for freedom of flexure between successive mounting means.

10. In a motor vehicle, in combination, a vehicle spring structure, auxiliary supporting means on said spring structure and including conduit anchoring means distributed lengthwise of the spring, and a liquid conduit attached at successive anchoring means, said conduit having substantially greater length between said anchoring means than the distance therebetween and thus having flexibility sufficient to accommodate the deformation of the spring.

11. In a chassis installation, a vehicle spring connected between the chassis frame and an axle, a plurality of fasteners mounted upon one of the leaves of the spring at intervals lengthwise thereof, and a conduit anchored upon and having curved portions between consecutive fasteners, thereby providing extra length for conduit flexure controlled by the displacement of the fasteners with the flexure of the spring in operation.

12. In a chassis lubricating installation, a vehicle spring connected between the chassis frame and an axle, a plurality of fasteners protruding from the spring at one of the sides thereof and moving in conformity with the flexing movement of the spring, and a conduit anchored upon and looped in respect to said fasteners and flexing to accommodate the differential displacement of consecutive fasteners.

13. In a chassis installation, in combination, a vehicle spring having a plurality of leaves, clips connecting said leaves together, anchoring means carried by one of said leaves and protruding therefrom and distributed along the length of said leaf, and a conduit supported by the anchoring means and having extra length between consecutive anchoring elements to accommodate the differential displacement of the successive anchoring elements in the flexure of the spring.

14. In a motor vehicle, in combination, a spring supporting the chassis frame upon an axle, said spring comprising a plurality of leaves, an inter-leaf having a ledge protruding beyond one of the sides of the spring, clip means maintaining said leaves in assembled relation, a fluid conveying conduit extending in a direction lengthwise of said spring, fasteners securing said conduit to said ledge, said conduit having extra length between successive fasteners to provide added flexibility.

15. The combination set forth in claim 14 in which the conduit is formed of rigid metal pipe and in which holding straps connect the conduit to the supporting ledge, and in which the length of the conduit is spaced from the corresponding side of the spring.

16. In a vehicle, in combination, an axle, a chassis frame, springs interposed therebetween, each including an eye at one end and a shackle at the other, a liquid conduit establishing communication between said frame and said axle, said conduit including a flexible metallic bridging run anchored at one end to the frame and at the other to the proximity of said shackle link, and a spring run extending from said bridging run in a direction lengthwise of the spring.

17. In a vehicle, which includes a chassis, a front axle, leaf springs connecting said chassis and axle, each said spring having an eye at one end and a shackle link connection to the chassis frame at the other end thereof; the combination therewith of a liquid conduit from the chassis frame to the axle, said conduit including a bridging run having a helical tubular metal bridging connection from the frame to a part of said spring contiguous to said shackle link, and a spring run extending lengthwise of said spring to the axle.

18. In a vehicle which includes a chassis frame, a front axle, leaf springs connecting said chassis and axle, each said spring having an eye at one end and a shackle link connection to the chassis frame at the other end thereof; the combination therewith of a bridging run connected between a part of the spring contiguous to the shackle and a neighboring portion of the chassis frame, said bridging run including a pair of series-connected hinging helical metallic conduits substantially coaxial with the upper and lower bolts of the shackle.

19. In a vehicle which includes a chassis, a front axle, leaf springs connecting said chassis and axle, each said spring having an eye at the front and a shackle link connection to the chassis frame at the rear thereof; the combination therewith of a bridging run connected between a part of the spring contiguous to the shackle and a neighboring portion of the chassis frame, said bridging run including a metallic tubular helix coaxial with the frame bolt of the shackle, at the exposed end thereof, a second helix coaxial with the spring eye bolt of the shackle and at the concealed side thereof, and a transverse coupling connection between said helices, said connection being anchored to one of the links of said shackle.

20. In a motor vehicle, in combination, a frame, an axle, an interposed spring, a conduit for establishing a fluid connection between the frame and the axle, said conduit including a run along the spring extending to near one end of the latter, a run extending from the frame and communicating with said first run, a unitary coupling member rigidly connecting the ends of the two runs in communicating relation, said coupling rigidly mounted on a part of the structure near the spring end, said runs having flexibility at opposite sides of the coupling to accommodate the relative movement of the parts in operation of the vehicle.

21. In a vehicle of the type which includes a chassis frame, an axle and an interposed spring structure which has a pivot part and a plurality of superposed leaves; the combination therewith of a conduit for fluid, connected between the frame and the axle, said conduit including a yielding connection from the frame to the vicinity of said pivot part the ends of which are closely adjacent to but substantially spaced from said pivot part, a run extending in a direction lengthwise of the spring toward the axle, disposed for distributed flexure thereof with said spring and retained in position between the uppermost and next to the uppermost leaves of said spring structure.

22. In a chassis lubricating installation for a vehicle having a frame, an axle and interposed springs, a conduit for bridging from the frame to an axle, said conduit having an upper run extending from a point of anchorage on said frame toward the bolt end of the spring and having a lower run extending rearward to said axle in a direction along the length of the spring, and a coupling connecting said runs, said upper run having flexibility for accommodation of the relative displacement between the ends thereof in vehicle operation, said lower run being disposed for distributed flexure thereof with said spring and at a multiplicity of spaced points rigid with the spring.

23. In a chassis installation, in combination, a conduit for delivering liquid from the chassis frame to an axle, said conduit including a bridging run from the chassis frame to the spring, a spring run along the spring to the axle and at a multiplicity of spaced points rigid with the spring, a coupling connecting contiguous ends of said bridging and said spring runs and means securing said coupling adjacent the bolt end of said spring.

24. In a chassis installation, in combination, a conduit for transmitting fluid between the chassis frame and an axle, said conduit including a bridging run from the chassis frame to one of the springs, a run along the spring to the axle and at a multiplicity of spaced points rigid with the spring, a coupling connecting contiguous ends of said bridging and said spring runs and means securing said coupling to the spring and adjacent the bolt end thereof.

Signed at New York in the county of New York and State of New York this 26th day of March A. D. 1923.

JOSEPH BIJUR.